United States Patent [19]

Coenders et al.

[11] Patent Number: 5,729,121
[45] Date of Patent: Mar. 17, 1998

[54] POWER SUPPLY APPARATUS

[75] Inventors: Johannes W. Coenders; Engbert B. G. Nijhof, both of Eindhoven, Netherlands

[73] Assignee: U.S. Philips Corporation, New York, N.Y.

[21] Appl. No.: 759,665

[22] Filed: Dec. 6, 1996

[30] Foreign Application Priority Data

Dec. 14, 1995 [EP] European Pat. Off. ............. 95203484

[51] Int. Cl.⁶ ........................... H01F 30/12; H02M 7/00
[52] U.S. Cl. ............................................... 323/361; 363/71
[58] Field of Search ............................. 323/355, 361; 363/15, 16, 20, 64, 65, 71

[56] References Cited

U.S. PATENT DOCUMENTS

| | | | |
|---|---|---|---|
| 4,447,695 | 5/1984 | Inoue | 219/69.13 |
| 4,805,078 | 2/1989 | Munz | 363/17 |
| 4,972,292 | 11/1990 | Petersen | 361/56 |
| 5,166,869 | 11/1992 | Hesterman | 363/25 |
| 5,373,433 | 12/1994 | Thomas | 323/361 |
| 5,434,770 | 7/1995 | Dreifuerst et al. | 363/65 |
| 5,508,905 | 4/1996 | Reichard | 363/71 |
| 5,587,892 | 12/1996 | Barrett | 363/44 |

*Primary Examiner*—Matthew V. Nguyen
*Attorney, Agent, or Firm*—Edward Blocker

[57] ABSTRACT

The apparatus comprises first and second input terminals (1, 3) for receiving an input voltage, a number of transformers (7), each of which comprises a primary winding (9) having first (13) and second (15) ends, and a secondary winding (11). At least one end of each primary winding is connected to a switching member (17) which comprises a first controllable switching element (19) and a second controllable switching element (21). This end (15) can be connected, via the first switching element (19), to the first input terminal (1) and, via the second switching element (21), to the second input terminal (3). The switching member (17) may be in a first state or a second state, the first switching element (19) being closed and the second switching element (21) being open in the first state whereas in the second state the first switching element is open and the second switching element is closed. The apparatus also comprises a control unit (31) for cyclically adjusting the various switching members (17) to the first and the second state at different instants.

15 Claims, 4 Drawing Sheets

POWER SUPPLY APPARATUS

BACKGROUND OF THE INVENTION

The invention relates to a power supply apparatus for converting an electric direct voltage, acting as an input voltage, into an output voltage, comprising first and second input terminals for receiving the input voltage, at least two transformers, each of which comprises a primary winding having first and second ends and a secondary winding, at least one of the ends of each primary winding being connectable to the first input terminal via an associated first controllable switching element, at least one end of each secondary winding being connected to a rectifier element in order to form a secondary circuit, said apparatus comprising a control unit for cyclically setting the various first switching elements to the open state and the closed state at different instants.

A power supply apparatus of this kind is known from U.S. Pat. No. 4,972,292. The switching in switched mode power supplies causes disturbing ripple voltages in the output voltage. In the known power supply apparatus the ripple voltages are reduced in that the apparatus is formed as if it were by a number of parallel-connected flyback converters (four in the described embodiment). As a result of this step, for a given output power, the ripple voltage superposed on the (rectified) output voltage has an amplitude amounting to only one quarter of the ripple voltage which would occur if the same power were delivered by a single flyback converter. The ripple voltage has the appearance of a sawtooth voltage having a repetition frequency which is four times higher than in the case of a single flyback converter. The same applies to the output current. Even though a substantial improvement is thus achieved, it has been found that considerable high-frequency components are still present in the remaining ripple voltage and ripple current, which components are not acceptable for some applications.

SUMMARY OF THE INVENTION

It is an object of the invention to provide a power supply apparatus of the kind set forth which delivers an output current and an output voltage in which only very few high-frequency components occur. To achieve this, the power supply apparatus in accordance with the invention is characterized in that each end of a primary winding connected to a first controllable switching element can also be connected to the second input terminal via a second controllable switching element which constitutes, in conjunction with the associated first switching element, a switching member which may be in a first state or in a second state, the first switching element being closed and the second switching element being open in the first state whereas the first switching element is open and the second switching element is closed in the second state. As a result of these steps, the current in the primary windings is not simply switched off some time after switching on, like in the known apparatus, but its direction is reversed. Consequently, the output current resembles a multiphase sinusoidal current rather than a sawtooth-shaped current, the number of phases being equal to the number of transformers. The output current thus contains fewer acute current peaks and hence fewer high-frequency components.

An embodiment of the power supply apparatus in accordance with the invention is characterized in that the control unit comprises sensors for measuring the electric current intensity in each of the primary windings and comparator means for comparing each current intensity measured with a first and a second reference value, the first reference value being larger than the second reference value, and that the control unit is arranged to control the switching member connected to a first primary winding in such a manner that it enters the first state if the current intensity in a second primary winding, associated with said first primary winding, is higher than the first reference value, and that it enters the second state if said current intensity is lower than the second reference value, each of the primary windings then acting once as first primary winding and once as second primary winding. This embodiment offers the advantage that the power supply apparatus is a self-oscillating type, so that the construction of the control unit may be comparatively simple. Moreover, the reference value can be adjusted by the user in such a manner that the apparatus delivers an output current having a desired value.

A further embodiment is characterized in that the first reference value is positive and the second reference value is negative, and that the first and second reference values have the same absolute value. In this embodiment the current in each of the transformers approximates a sinusoidal current having a mean value zero.

A preferred embodiment, in which the control unit may have a very simple and inexpensive construction, is characterized in that for each pair formed by a first and a second primary winding the control unit comprises a double comparator which comprises first, second and third inputs for receiving a first, a second and a third input signal, respectively, the first input signal being proportional to the current intensity measured in the second primary winding and the second and third input signals being proportional to the first and the second reference value, respectively, and also comprises first and second outputs which are connected to a set input and a reset input, respectively, of a bistable element, an output of which is connected to control terminals of the switching member connected to the first primary winding.

As has already been stated, the output current has the appearance of a multiphase current, the number of phases being equal to the number of transformers. The larger the number of phases, the lower for a given output power the amplitude of the ripple current or ripple voltage will be after rectifying. The costs of the apparatus, however, is substantially increased by the addition of more transformers. In practice a suitable compromise is found by choosing a number of three transformers.

These and other aspects of the invention will be apparent from and elucidated with reference to the embodiments described hereinafter.

DESCRIPTION OF THE PREFERRED EMBODIMENTS

Figure 1:
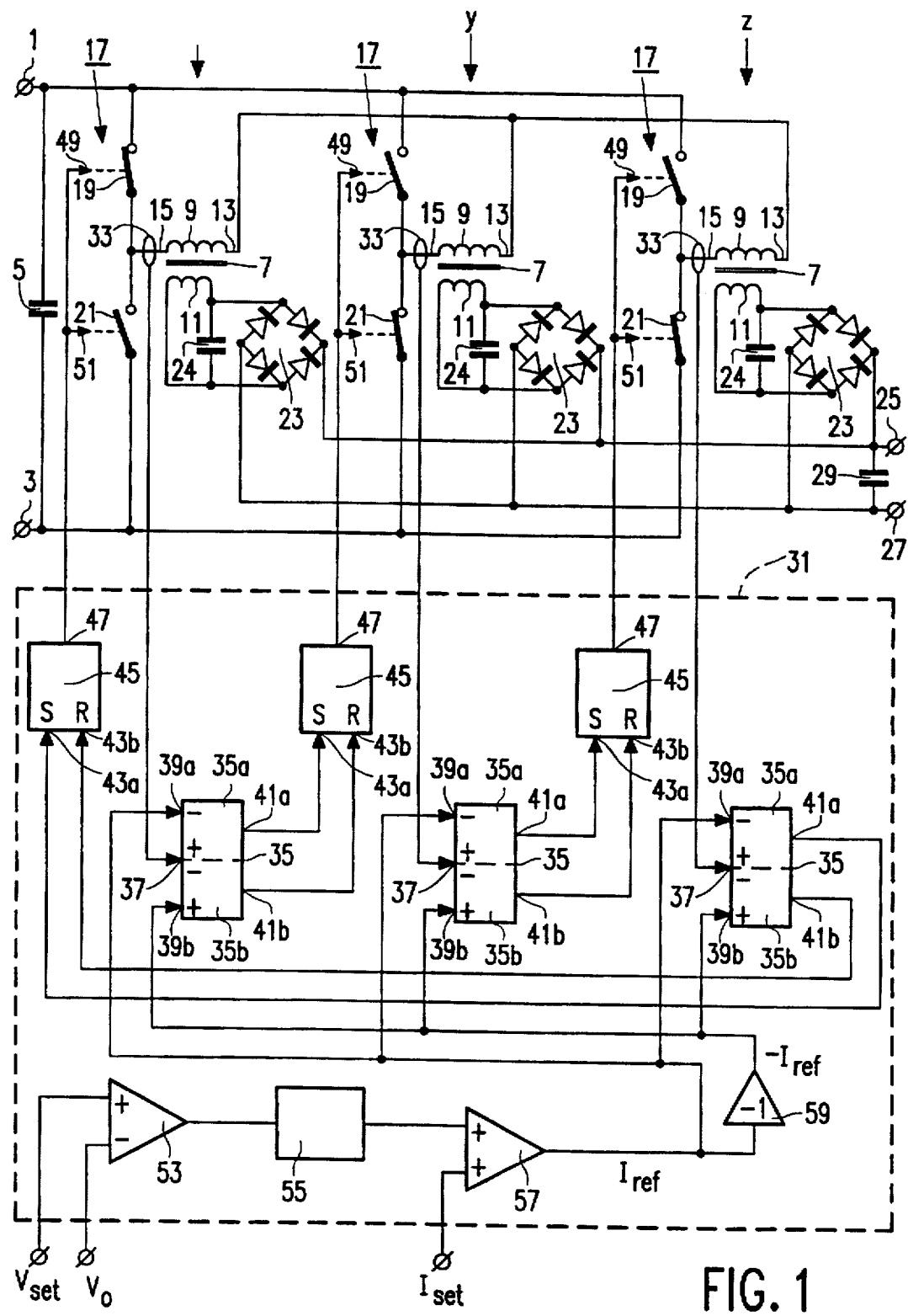
FIG. 1 is an electric diagram of an embodiment of a power supply apparatus in accordance with the invention.

The power supply apparatus shown in FIG. 1 comprises a first input terminal 1 and a second input terminal 3 for receiving a direct voltage which acts as an input voltage and which may originate, for example from a rectifier which is connected to an electric mains (not shown). The input terminals 1, 3 are interconnected by way of a buffer capacitor 5. The present embodiment of the apparatus comprises three identical sections which are denoted by the references x, y and z. Each section comprises a transformer 7 which includes a primary winding 9 and a secondary winding 11. The transformer 7 has a suitably chosen coupling factor which is less than 1, for example 0.95. Each primary winding 9 has a first end 13 and a second end 15. The first ends 13 of all primary windings 9 are interconnected. The second end 15 of each primary winding is connected to a switching member 17 which comprises a first switching element 19 and a series-connected second switching element 21. The switching elements 19, 21 are controllable switching elements, preferably semiconductor switching elements, such as bipolar transistors, FETs or IGBTs. When the first switching element 19 is closed, it establishes an electric connection between the second end 15 of the associated primary winding 9 and the first input terminal 1. When the second switching element 21 is closed, it establishes a connection between the second end 15 of the associated primary winding 9 and the second input terminal 3. The switching member 17 is arranged so that it can be in a first state or a second state. In the first state the first switching element 19 is closed and the second switching element 21 is open whereas in the second state the first switching element is open whereas in the second switching element is closed. Hereinafter, the first state will also be referred to as the state 1 and the second state as the state 0. The switching member 17 cannot enter a state other than said two states.

The secondary winding 11 of each transformer 7 constitutes, in conjunction with a rectifier element 23 (for example, a diode bridge circuit), a secondary circuit which also includes a secondary capacitor 24. The function of this capacitor will be described in detail hereinafter. All secondary circuits thus formed are connected in parallel to first and second output terminals 25, 27 whereto a load (not shown) can be connected. The output terminals 25, 27 are interconnected via an output capacitor 29.

The power supply apparatus also comprises a control unit 31 for controlling the switching members 17. The control unit 31 comprises sensors 33 for measuring the electric current intensity in each of the primary windings 9. The sensors 33 may comprise known devices for measuring current intensities, for example current transformers or resistors of low value across which the voltage generated by the current is measured. The control unit also comprises comparator means 35 for comparing each current intensity measured by a sensor 33 with a first and a second reference value. Each comparator means 35 in the embodiment shown is formed by a known double comparator, being an assembly of a first and a second comparator, 35a and 35b, the positive input of the first comparator being connected to the negative input of the second comparator in order to form a first input 37 of the double comparator, the negative input of the first comparator and the positive input of the second comparator constituting a second and a third input, 39a and 39b, respectively, of the double comparator. The signal produced by the sensor 33, being proportional to the measured current intensity, is applied to the first input 37. The second input 39a receives a signal which is proportional to a first reference value $I_{ref}$ and the third input 39b receives a signal which is proportional to a second reference value $-I_{ref}$, the first reference value being greater than the second reference value. The two reference values have the same absolute value in the present embodiment, the first reference value $I_{ref}$ being positive and the second reference value $-I_{ref}$ negative. Evidently, other choices are also feasible for these reference values.

Furthermore, each double comparator 35 comprises a first output 41a which corresponds to the output of the first comparator 35a, and a second output 41b which corresponds to the output of the second comparator 35b. The first output 41a of each double comparator 35 is connected to a set input 43a of a bistable element 45 and the second output is connected to a reset input 43b of the same element. The bistable element 45 may be, for example a known flip-flop circuit. Each bistable element 45 comprises an output 47 which is connected to first and second control terminals 49 and 51, respectively, of one of the switching members 17. If the switching elements 19, 21 are formed, for example, by bipolar transistors, the first and second control terminals 49 and 51 may be formed by the base terminals of these transistors.

FIG. 1 shows that the sensor 33, measuring the current $I_x$ in the primary winding 9 of the first section x, is connected to the first input 37 of the double comparator 35 associated with the bistable element 45 which controls the switching member 17 connected to the primary winding 9 of the second section y. Generally speaking, the primary winding 9 in a given section acts as the second primary winding wherefrom the control signal for controlling the switching member 17 connected to a first primary winding in the next section is derived. Each primary winding 9 thus acts once as a first primary winding and once as a second primary winding, the current $I_i$ in the second primary winding in the section i then governing the state of the switching member 17 connected to the first primary winding in the section j. i and j then successively assume the values x, y, z and y, z, x, respectively.

The first and second reference values $I_{ref}$ and $-I_{ref}$ can be generated in various ways. FIG. 1 shows an example in which the output voltage $V_o$ (measured between the output terminals 25, 27) is subtracted from an adjustable voltage signal $V_{set}$ in a differential amplifier 53, after which the output signal of the first differential amplifier is applied, via a filter 55, to a summing amplifier 57 in which it is added to an adjustable current signal $I_{set}$. The output signal of the summing amplifier 57 constitutes the first reference signal $I_{ref}$ which is applied directly to the second inputs 39a of the double comparators 35. Moreover, this signal is applied as a second reference signal $-I_{ref}$ via an inverting amplifier 59, to the second inputs 39b of the double comparator 35.

The operation of the power supply apparatus shown in FIG. 1 will be described in detail hereinafter with reference to FIG. 2 in which the various states successively assumed by the switching members 17 are represented in simplified diagrams. The diagrams show merely the primary windings 9, the switching members 17, the first and second input terminals 1, 3, and the buffer capacitor 5. To the right of each diagram there are shown the states of the switching members 17 of the sections x, y and z; the reference 1 denotes the first state whereas the second state is denoted by the reference 0. The combinations of states occurring are chosen so that the second end 15 of each primary winding 9 is always directly connected, via the first switching element 19 or the second switching element 21, to the first input terminal 1 or to the second input terminal 3, respectively, whereas the first end 13 is connected, via one or two of the remaining primary windings and the associated second or first switching elements, to the second or the first input terminal, respectively. Between the first and second input terminals 1 and 3, therefore, there is always present a series connection comprising on the one hand a single primary winding 9 and on the other hand a parallel connection of two primary windings. Each input terminal 1, 3 is then alternately connected to a single primary winding or to two parallel-connected primary windings. The current from the first input terminal 1 to the second input terminal 3 thus flows entirely through one of the primary windings 9 and partly through each of the other two primary windings. The direction in which the current changes is denoted by an arrow for each primary winding. The current is considered to be positive if it flows from left to right in the Figure and negative if it flows from right to left. Thus, an arrow pointing to the right denotes a current which changes in the positive direction whereas an arrow pointing to the left denotes a current which changes in the negative direction.

In the first state 100 (FIG. 2A) the current $I_x$ in the first section x increases until it reaches the first reference value $I_{ref}$. The bistable element 45 associated with the second section y then receives a signal on its set input 43a from the associated double comparator 35 and in response thereto it produces an output signal which adjusts the switching member 17 of the second section y to the first state 1. The state 110 thus arising is shown in FIG. 2B. The direction in which the current $I_y$ changes is thus reversed from negative to positive, so that $I_x$ as well as $I_y$ then change in the positive sense. As a result, $I_z$ will quickly change in the negative sense until it reaches the second reference value $-I_{ref}$. The bistable element 45 associated with the third section z then receives a signal on its reset input 43b from the associated double comparator 35 and in response thereto it generates an output signal which adjusts the switching member 17 of the first section x to the state 0. The state 010 thus obtained is shown in FIG. 2C. The direction in which the current $I_x$ changes is then reversed from positive to negative, so that $I_x$ and $I_z$ change in the negative sense. As a result, $I_y$ will quickly change in the positive sense until the first reference value $I_{ref}$ is reached; this causes the switching over of the switching member 17 of the third section z to the first state 1 as is already known. From the state 011 then reached (FIG. 2D) the states 001 (FIG. 2E) and 101 (FIG. 2F) are successively assumed in an analogous manner, after which the initial state 100 (FIG. 2A) is reached again.

Figure 2A:
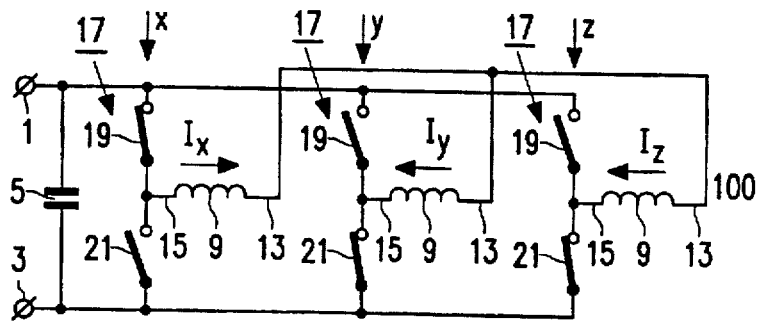
FIGS. 2A–2F shows the various states successively assumed by the switching members of the apparatus shown in FIG. 1.
Figure 2B:
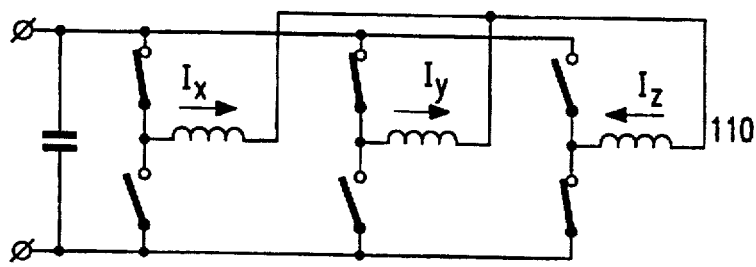
Figure 2C:
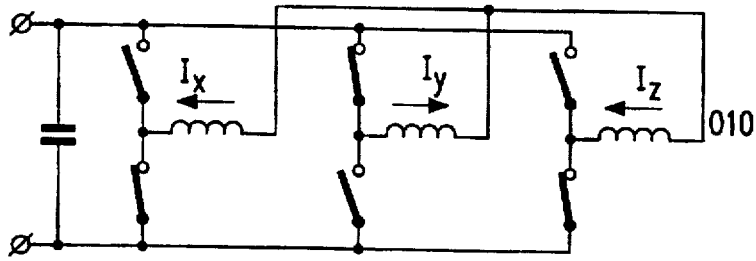
Figure 2D:
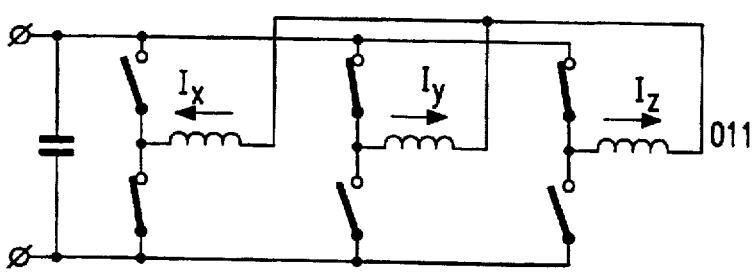
Figure 2E:
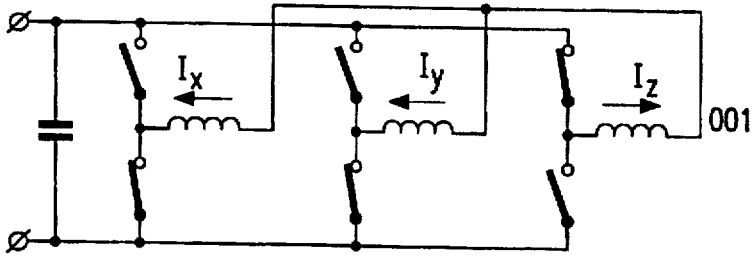
Figure 2F:
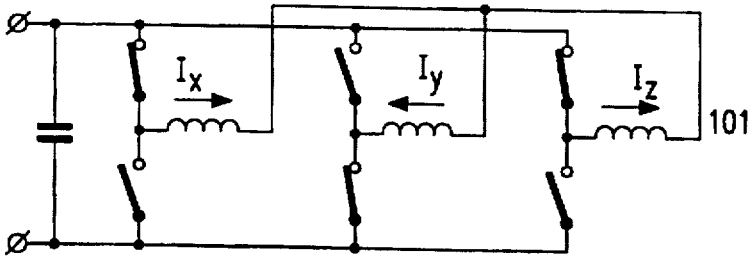
Figure 3:
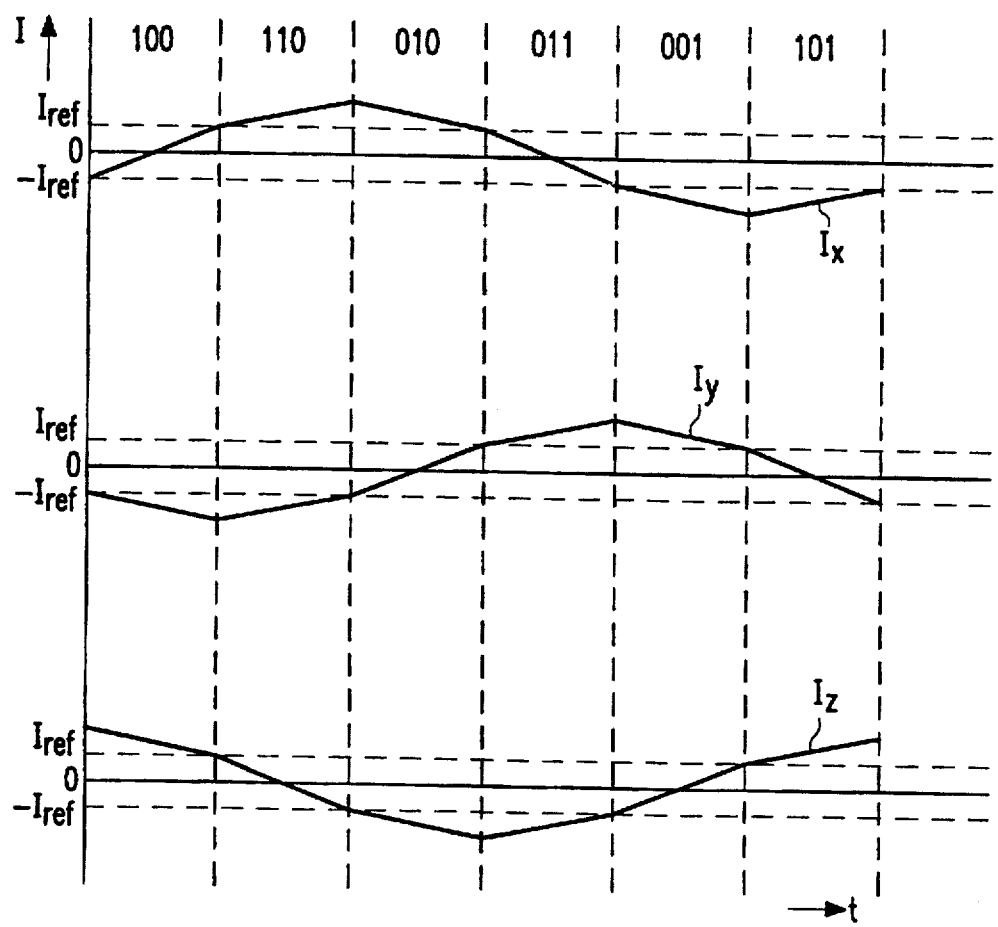
FIG. 3 shows diagrammatically the variation of the currents in the primary windings of the transformers of the apparatus shown in FIG. 1, FIGS. 4A–4C show a simplified diagram of a part of the apparatus shown in FIG. 1, and a diagram which further illustrates the operation.
Figure 5:
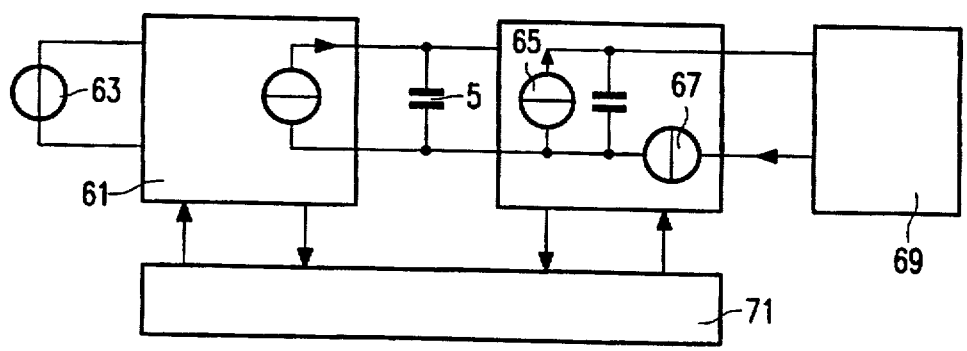
FIG. 5 shows a block diagram of a feasible application of the power supply apparatus in accordance with the invention.

FIG. 3 shows the variation of the primary currents $I_x$, $I_y$ and $I_z$ during the cycle described with reference to FIG. 2. The time t is plotted horizontally and the variation in time during the cycle is subdivided into six periods which are shown at the top of the Figure with the states of the switching members as shown in FIG. 2. The value of the three currents $I_x$, $I_y$ and $I_z$ is plotted vertically, the graphs representing the currents being shown one underneath the other instead of one on top of the other. The variation of the currents as described with reference to FIG. 2 can be recognized in FIG. 3: in the state 100 $I_x$ increases comparatively quickly whereas $I_y$ and $I_z$ decrease comparatively slowly; after $I_x$ has reached the value $I_{ref}$, $I_z$ starts to decrease comparatively quickly and $I_x$ and $I_y$ slowly increase further, etc. The Figure directly shows that the variation of each of the primary currents is approximately sinusoidal. The same, of course, holds for the variation of the secondary currents in the secondary windings 11. The secondary currents, consequently, do not exhibit acute peaks and hence hardly any high-frequency components. The secondary currents are rectified by the rectifier elements 23 so as to be added. The resultant direct current is approximately proportional to $N*I_{ref}$ in which N is the transformation ratio of the transformers 7. The ripple superposed on this current is very small. The circuit operates as a self-oscillating power supply, in which the oscillation frequency is dependent on the magnitude of $I_{ref}$.

As has already been stated, in the state 100 indicated in FIG. 2A the current $I_x$ increases until it reaches the first reference value $I_{ref}$. The increase of $I_x$ is dependent inter alia on the difference between the primary and the secondary voltage and on the leakage inductance of the transformer 7 which is known to be dependent on the coupling factor chosen. The variation of the currents and voltages in a section (for example, the section x) will be briefly described hereinafter with reference to FIG. 4.

Figure 4A:
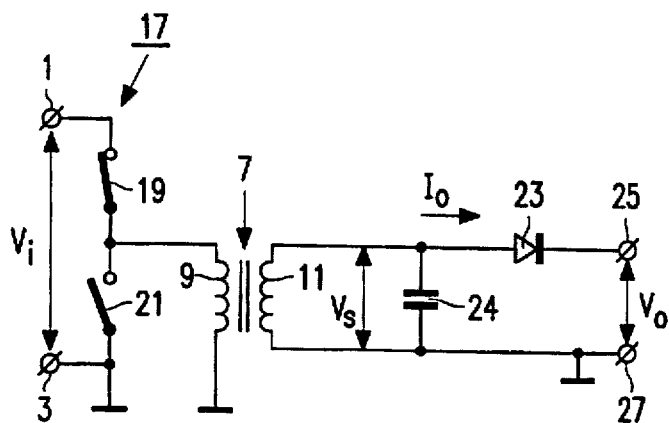
Figure 4B:
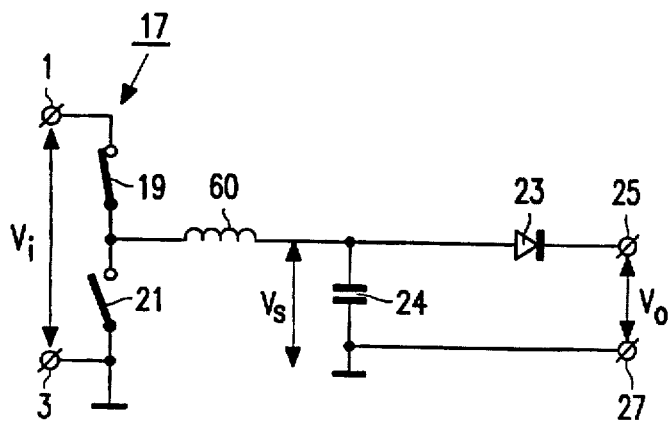
Figure 4C:
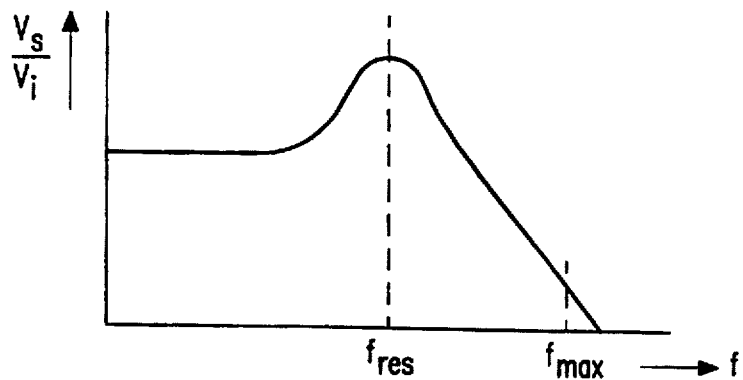

FIG. 4A shows a simplified diagram of the section x in which the primary winding 9 can be connected directly to an input voltage $V_i$ via the switching member 17. The rectifier element 23 in the secondary circuit is shown as a simple diode. FIG. 4B shows an equivalent diagram of this simplified circuit, the transformation ratio of the transformer 7 being assumed to be 1 for the sake of simplicity. The transformer 7 can then be replaced by its leakage inductance 60. If use were made of a transformer 7 having a different transformation ratio, an ideal transformer having said transformation ratio would have to be added. The basic circuit shown can produce low output currents $I_o$ only in the case of high switching frequencies. In practice high switching frequencies are not very well possible and a resonant circuit will offer advantages. To this end there is provided the secondary capacitor 24 which constitutes a resonant circuit in conjunction with the leakage inductance 60. The transfer $V_s/V_i$ (the ratio of the secondary voltage $V_s$ to the input voltage $V_i$) as a function of the switching frequency f is shown in FIG. 4C for a non-conductive diode 23. Below the resonant frequency $F_{res}$ of said resonant circuit, $V_s/V_i$ equals 1 (if the transformation ratio of the transformer 7 is assumed to be equal to 1). In the vicinity of $f_{res}$ boosting takes place and the ratio $V_s/V_i$ becomes greater than 1. Beyond $f_{res}$ this ratio decreases approximately linearly. In this range (up to a maximum frequency $f_{max}$) the switching frequency f can be used to control the transfer. For as long as $V_s$ is lower than the output voltage $V_o$, the output current $I_o$ will be equal to zero because the diode 23 is not conductive. The transfer chosen indicates which minimum output voltages ($V_o=V_s$) can be attained for a given $V_i$ and for $I_o=0$. $V_o=0$ and $I_o=0$ cannot be attained simultaneously, but this is usually not problematic in the case of switched mode power supplies. A further advantage of the capacitor 24 resides in the fact that it provides spectral limitation of the currents in the circuit, so that it causes less interference (EMC).

Evidently, the invention is not restricted to the embodiment shown. For example, the number of transformers 7 may be a number other than three, but preferably a multiple of three because such a value is most convenient from a construction point of view. The ripple current will be smaller as the number of transformers is larger. In the embodiment shown the first ends 13 of the primary windings 9 are connected to one another so that these windings constitute a star configuration. It is alternatively possible to connect these windings in a delta configuration by connecting each time the second end of a winding to the first end of a subsequent winding: for example, the first end 13 of the primary winding 9 in the section x to the second end 15 of the primary winding 9 in the section y, etc. Similarly, the secondary windings may also be star connected or delta-connected as desired. The control unit 31 shown can be simply replaced by any circuit capable of executing the described functions (comparison and control), for example a suitably programmed processor.

The power supply apparatus shown may be used, for example as an independent apparatus but also as a power supply section of a further apparatus. FIG. 4 shows a block diagram of an application for which the apparatus is particularly suitable. It concerns power supply for an electrochemical process in which metal ions are removed from a workpiece by means of electric charges in an electrolytic liquid. This process requires current pulses of from 100 to 1000 A with a rise and fall time of approximately 100 μs, a duration of approximately 1 ms and a duty cycle of approximately 35%. The voltage required for this process must be variable between 0 and 50 V and the efficiency of the power supply must be higher than 70%. The loading of the electricity mains must comply with the IEC-555 standard. These requirements are satisfied by the power supply shown in FIG. 4. The power supply is connected to the electric mains 63 via a known mains rectifier with line conditioner 61. The line conditioner provides resistive loading of the mains 63 and makes load variations gradual, so that the IEC-555 requirements are satisfied. The buffer capacitor 5 is connected parallel to the output of the line conditioner; the input terminals of the power supply apparatus 65 described in detail with reference to the FIGS. 1 to 3 are connected to said capacitor. The power supply apparatus 65 is connected, via a known linear current source 67, to the electrochemical process 69 which is not shown in detail. A control device 71 measures the voltage across the linear current source 67 and determines the value to be attained by the output voltage of the power supply apparatus 65. The control unit 31 (FIG. 1) may form part of the control device 71. It will thus be seen that the objects set forth above and those made apparent from the preceding description are efficiently attained, and since certain changes can be made in the above construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

We claim:

1. A power supply apparatus for converting an electric direct voltage, acting as an input voltage, into an output voltage, comprising first and second input terminals for receiving the input voltage, at least a first transformer and a second transformer, each of which comprises a primary winding having first and second ends and a secondary winding, at least one of the ends of each primary winding being connectable to the first input terminal via an associated first switching element, at least one end of each secondary winding being connected to a rectifier element in order to form a secondary circuit, said apparatus further comprising a control unit for cyclically setting the first switching elements to the open state and the closed state at different instants of time, characterized in that each end of a different primary winding connected to the first controllable switching element is switchably connectable to the second input terminal via a second switching element based on the switching state of a switching member, the first switching element and the second switching element being closed and open in a first state and open and closed in a second state of the switching member, respectively.

2. The power supply apparatus as claimed in claim 1, characterized in that the control unit comprises sensors for measuring the electric current intensity in each of the primary windings and comparator means for comparing each current intensity measured with a first and a second reference value, the first reference value being larger than the second reference value and wherein the primary winding of the second transformer is coupled to the first input terminal through the primary winding of the first transformer during the first state of the switching member and wherein the primary winding of the first transformer is coupled to the first input terminal through the primary winding of the second transformer during the second state of the switching member; the switching member entering the first state when the current intensity in the primary winding of the second transformer is higher than the first reference value and entering the second state when the current intensity is lower than the second reference value.

3. The power supply apparatus as claimed in claim 2, characterized in that the first reference value is positive and the second reference value is negative, and that the first and second reference values have the same absolute value.

4. The power supply apparatus as claimed in claim 2, characterized in that for each pair of primary windings the control unit comprises a double comparator having first, second and third inputs for receiving a first, a second and a third input signal, respectively, and first, second and third outputs, the first input signal being proportional to the current intensity measured in one of the pair of primary windings, the second and third input signals being proportional to the first and the second reference values, respectively, the first and second outputs being connected to a set input and a reset input, respectively, of a bistable element and the third output being connected to control terminals of the switching member.

5. The power supply apparatus as claimed in claim 1, including three transformers.

6. A power supply apparatus as claimed in claim 3, characterized in that for each pair formed by a first and a second primary winding (9) the control unit (31) comprises a double comparator (35) which comprises first, second and third inputs (37, 39a, 39b) for receiving a first, a second and a third input signal, respectively, the first input signal being proportional to the current intensity measured in the second primary winding and the second and third input signals being proportional to the first ($I_{ref}$) and the second reference value ($-I_{ref}$), respectively, and also comprises first and second outputs (41a, 41b) which are connected to a set input (43a) and a reset input (43b), respectively, of a bistable element (45), an output (47) of which is connected to control terminals (49, 51) of the switching member (17) connected to the first primary winding.

7. A power supply apparatus as claimed in claim 2, characterized in that three transformers (7) are provided.

8. A power supply apparatus as claimed in claim 3, characterized in that three transformers (7) are provided.

9. A power supply apparatus as claimed in claim 4, characterized in that three transformers (7) are provided.

10. A power supply apparatus as claimed in claim 6, characterized in that three transformers (7) are provided.

11. A power supply apparatus as claimed in claim 3, characterized in that for each pair formed by a first and a second primary winding the control unit comprises a double comparator which comprises first, second and third inputs for receiving a first, a second and a third input signal, respectively, the first input signal being proportional to the current intensity measured in the second primary winding and the second and third input signals being proportional to the first ($I_{ref}$) and the second reference value ($-I_{ref}$), respectively, and also comprises first and second outputs which are connected to a set input and a reset input, respectively, of a bistable element, and the third output being connected to control terminals of the switching member.

12. A power supply apparatus as claimed in claim 2, including three transformers.

13. A power supply apparatus as claimed in claim 3, including three transformers.

14. A power supply apparatus as claimed in claim 4, including three transformers are.

15. A power supply apparatus as claimed in claim 6, including three transformers.

* * * * *